US008666597B2

(12) United States Patent
Fernandez et al.

(10) Patent No.: US 8,666,597 B2
(45) Date of Patent: Mar. 4, 2014

(54) ELECTRICAL POWER ASSISTED STEERING SYSTEM (75) Inventors: Angel Luis Andres Fernandez, Rochester, MI (US); Kevin McLaughlin, Troy, MI (US)

(73) Assignees: TRW Limited, West Midlands (GB); TRW Automotive, Livonia, MI (US)

( * ) Notice: Subject to any disclaimer, the term of this patent is extended or adjusted under 35 U.S.C. 154(b) by 890 days.

(21) Appl. No.: 12/085,512

(22) PCT Filed: Nov. 23, 2006

(86) PCT No.: PCT/GB2006/004383
§ 371 (c)(1),
(2), (4) Date: Jan. 28, 2010

(87) PCT Pub. No.: WO2007/060435
PCT Pub. Date: May 31, 2007

(65) Prior Publication Data
US 2010/0125390 A1  May 20, 2010

Related U.S. Application Data (60) Provisional application No. 60/739,504, filed on Nov. 23, 2005.

(51) Int. Cl.
*B62D 6/00* (2006.01)
(52) U.S. Cl.
USPC ............ 701/41; 318/34; 318/432; 280/5.507; 180/443; 180/446
(58) Field of Classification Search
USPC ................... 701/41; 318/34, 432; 280/5.507; 180/443, 446
See application file for complete search history.

(56) References Cited

U.S. PATENT DOCUMENTS

| 4,598,787 A | 7/1986 | Drutchas |
| 4,700,307 A | 10/1987 | Mons et al. |

(Continued)

FOREIGN PATENT DOCUMENTS

| DE | 10314205 | 10/2003 |
| EP | 0864722 | 9/1998 |

(Continued)

OTHER PUBLICATIONS

"Torque Converter" definition from Access Science Encyclopedia published by McGraw Hill Companies, 2 pages.*

*Primary Examiner* — James P Trammell
*Assistant Examiner* — Sanjeev Malhotra
(74) *Attorney, Agent, or Firm* — MacMillan, Sobanski & Todd, LLC (57) ABSTRACT An electric power assisted steering system for a vehicle, comprising: a steering mechanism which operatively connects a steering wheel to road wheels of the vehicle, a torque sensor arranged to, in use, produce a torque signal indicative of the torque carried by a portion of the steering mechanism, an electric motor operatively connected to the steering mechanism, a signal processing unit arranged to, in use, produce from the torque signal a torque demand signal representative of a torque to be applied to the steering mechanism by the motor, the signal processing unit comprising a first calculating unit arranged to calculate an initial torque demand signal dependent on the torque signal, and a second calculating unit arranged to, in use, calculate a torque damping signal indicative of an amount of the initial torque signal is to be damped in order to generate the torque demand signal, and a motor drive stage arranged to provide, in use, a drive current to the motor responsive to the torque demand signal, in which the second calculating unit comprises an input for a signal dependent upon the torque demand signal, a differentiator, arranged to, in use, differentiate the input signal dependent upon the torque signal and a high pass filter arranged to filter the input signal to reduce low frequency components thereof.

10 Claims, 5 Drawing Sheets (56) References Cited

U.S. PATENT DOCUMENTS

| | | | |
|---|---|---|---|
| 5,894,205 A * | 4/1999 | Shimizu et al. | 318/432 |
| 6,598,699 B2 * | 7/2003 | Takehara et al. | 180/446 |
| 6,598,885 B2 * | 7/2003 | Delorenzis et al. | 280/5.507 |
| 2001/0028228 A1 * | 10/2001 | Toyozawa et al. | 318/34 |
| 2002/0079157 A1 * | 6/2002 | Song | 180/446 |
| 2003/0125871 A1 | 7/2003 | Cherveny et al. | |
| 2004/0162655 A1 | 8/2004 | Patankar | |
| 2005/0087387 A1 * | 4/2005 | Ueda et al. | 180/443 |
| 2005/0125124 A1 * | 6/2005 | Nagase et al. | 701/41 |
| 2005/0150711 A1 * | 7/2005 | Burton et al. | 180/443 |
| 2006/0045115 A1 | 3/2006 | Nix et al. | |

FOREIGN PATENT DOCUMENTS

| | | | | |
|---|---|---|---|---|
| EP | 1 170 196 A2 | 1/2002 | | |
| EP | 1172278 A2 * | 1/2002 | | B62D 5/04 |
| EP | 1209053 | 5/2002 | | |
| EP | 1076276 | 8/2004 | | |
| EP | 1516800 | 3/2005 | | |
| EP | 1 172 278 B1 | 12/2006 | | |
| JP | 2006256425 | 9/2006 | | |
| WO | WO0112492 | 2/2001 | | |
| WO | WO 03/086839 A1 * | 10/2003 | | B62D 6/00 |

* cited by examiner

ELECTRICAL POWER ASSISTED STEERING SYSTEM

CROSS-REFERENCE TO RELATED APPLICATIONS

This application is the National Stage of International Application No. PCT/GB2006/004383 filed Nov. 23, 2006, the disclosures of which are incorporated herein by reference in their entirety, and which claimed priority to U.S. Patent Application No. 60/739,504 filed Nov. 23, 2005, the disclosures of which are incorporated herein by reference in their entirety.

BACKGROUND OF THE INVENTION

This invention relates to electrical power assisted steering systems of the kind in which an electrical motor is adapted to apply an assistance torque to a steering component such as a steering column so as to reduce the driver effort required to control the vehicle.

In a simple electric power assisted steering system a torque sensor is provided which is arranged so that the level of torque in a steering column is measured. From this measurement a controller calculates the value of a torque demand signal which includes an assistance torque component that is indicative of the torque that is to be generated by an electric motor attached to the steering column. The motor applies an assistance torque to the column of the same sense as that demanded by the driver and thus reduces the effort needed to turn the wheel.

A problem with this simple arrangement occurs in certain driving manoeuvres which excite a vehicle yaw mode transient response—leading to so-called "fish-tailing" of the vehicle. These manoeuvres are typically the result of "unsupported" driver actions on the handwheel such as rotational "flicks" where the driver applies a rapid handwheel angle change but does not follow it through with any substantial applied torque or perhaps releases the handwheel after initiating a rapid turn.

In such circumstances it is desirable that the handwheel returns to the central "straight-ahead" position quickly and with a minimum amount of overshoot or oscillation. In general, however, geometric and inertial effects of the steering system contribute to a free mode yaw response that is lightly damped and quite oscillatory—particularly at high vehicle speeds.

It is known in the art to overcome this problem by including a damping component within the torque demand signal that is used to drive the motor. This damping component in some sense mimics the mechanical phenomenon of viscous friction through software by generating a component of torque demand that is a function of the handwheel velocity. The damping component generally increases in magnitude as a function of steering angular velocity from zero torque at zero rotational speed to a maximum at some arbitrary maximum speed. In effect, the damping component reduces the actual torque output by the motor, and hence the amount of assistance, in a particular instance when the velocities are high. This gives increased damping and hence stability at high vehicle speeds.

It is further known to provide an electric power assisted steering system in which the damping component is a function of the torque carried by as well as angular velocity of the steering column with the damping component being reduced at low torques compared to the magnitude of the damping component at high torques. Thus, in hands free manoeuvres where no torque is present in the column the damping will be relatively high and yet be lower during hands on manoeuvres in which torque is generally present in the column.

It has been proposed in PCT publication number WO03/086839 to provide an electronic power assisted steering system in which the damping component is a function of the differential of the torque demand. Optionally, a low-pass filter is provided, which reduces the amount of damping during low-frequency manoeuvres.

BRIEF SUMMARY OF THE INVENTION

According to a first aspect of the invention, there is provided an electric power assisted steering system for a vehicle, comprising:

a steering mechanism which operatively connects a steering wheel to road wheels of the vehicle, a torque sensor arranged to, in use, produce a torque signal indicative of the torque carried by a portion of the steering mechanism, an electric motor operatively connected to the steering mechanism, a signal processing unit arranged to, in use, produce from the torque signal a torque demand signal representative of a torque to be applied to the steering mechanism by the motor, the signal processing unit comprising a first calculating unit arranged to calculate an initial torque demand signal dependent on the torque signal, and a second calculating unit arranged to, in use, calculate a torque damping signal indicative of an amount the initial torque signal is to be damped in order to generate the torque demand signal, and a motor drive stage arranged to provide, in use, a drive current to the motor responsive to the torque demand signal, in which the second calculating unit comprises an input for a signal dependent upon the torque demand signal, a differentiator, arranged to, in use, differentiate the input signal dependent upon the torque signal and a high pass filter arranged to filter the input signal to reduce low frequency components thereof.

Figure 6:
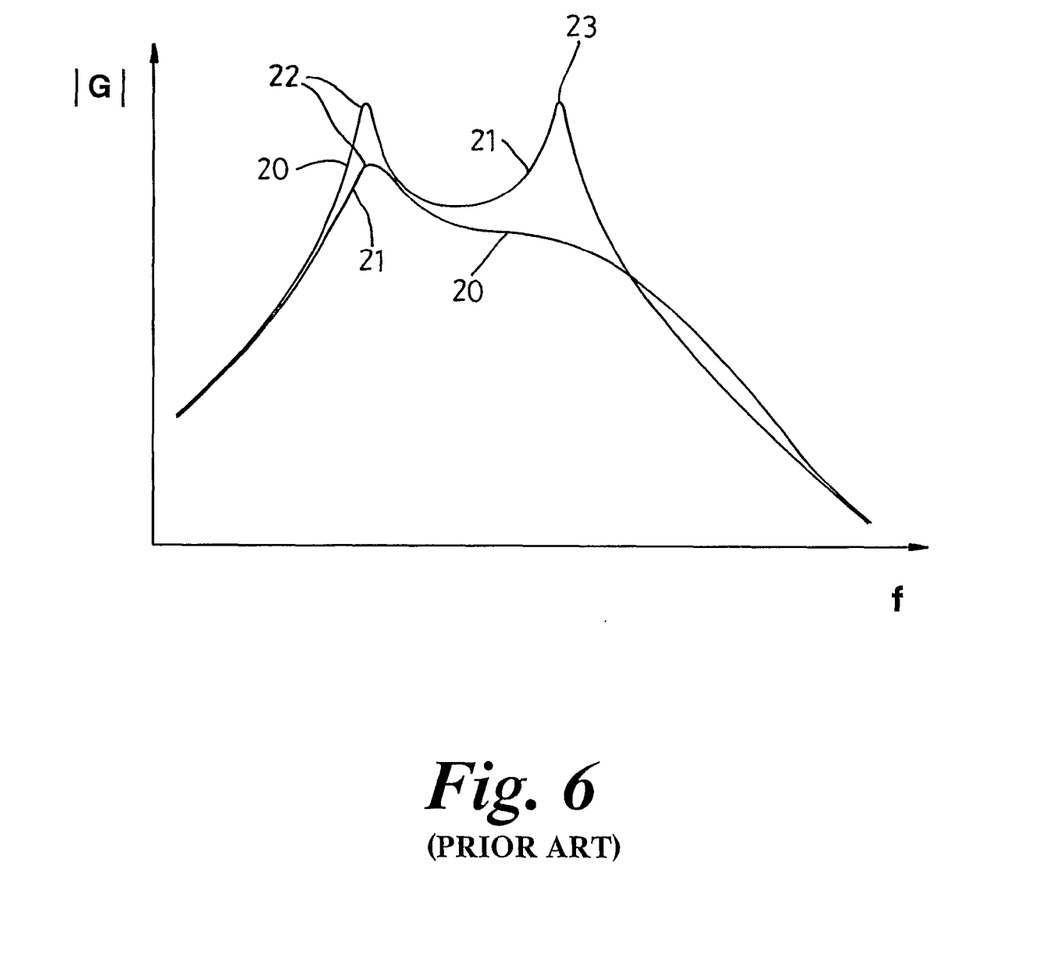
FIG. 6 compares the frequency response of an EPAS without any damping, and with damping only dependent on the differentiated torque signal.

It has been realised that, in the prior art case without damping, an EPAS system can be characterised by two undesirable oscillatory modes. These are shown in trace 21 in the Bode plot in FIG. 6. In the first mode—the peak shown at 22—the total inertia of the system resonates against the tyre stiffness; all inertias move in phase. In the second mode—the peak shown at 23—the steering wheel inertia resonates against the motor and steering gear inertia out of phase. Differentiating the torque signal (or a signal dependent thereon) provides a frequency response of the form shown at 20 in FIG. 6. The differentiation provides a damping torque at a 90 degree phase advance which damps out the second mode (relative motion between motor and steering wheel) by accelerating the motor; the peak 23 is not seen in trace 20.

The limitation of this strategy is that using damping dependent on the differential of the torque signal can destabilise the motion of the system and lead to increased oscillations in the first mode of the system because motor torque is applied with the wrong phase. This can be seen in FIG. 6 in that the peak 22 has increased in height between traces 21 and 20. By including a high pass filter this effect can be reduced by providing less gain at low frequencies. It also improves directly improves the on-centre feel as less motor action is provided at low frequencies.

Typically, the high pass filter is, in use, applied to the output of the differentiator; alternatively, the input signal may be applied to the filter before being passed to the differentiator.

The input signal may be the torque signal itself, or may be some signal dependent thereon.

Preferably, the second calculating unit is arranged to work on the input signal in the frequency domain. The second calculating unit may therefore be arranged to, in use, carry out a transform on the input signal. A suitable transform would be the Lorenz transform, although other transforms such as the Fourier transform would be acceptable. Accordingly, the application of at least one of the filter and the differentiator to the input signal may be represented by the application of a transfer function to the input signal. The transfer function may be of the form G(s) where s is the angular frequency:

$$G(s) = K_a s \frac{s}{s + wc}$$

where $K_a$ is typically a constant and we is a cut-off frequency.

The second calculating unit may be provided with an input for the vehicle speed. Accordingly, the amount of damping may be reduced at low speed, so as to improve the feel of low speed manoeuvres.

Preferably, the signal processing unit is arranged to, in use, combine the amount of torque indicated by the torque damping signal with the amount of torque indicated by the initial torque demand signal in order to generate the torque demand signal. Preferably, the amounts are combined in an additive manner. In an especially preferred embodiment, the signals are combined so as to add, rather than subtract, the amount of torque indicated by the torque damping signal to the amount of torque indicated by the initial torque demand signal. Accordingly, the undesirable oscillatory modes can possibly be avoided by providing extra assistance at those points where it may prove necessary.

The first calculating unit may be provided with an input for the torque signal and an output for the initial torque demand. The first processing unit may also comprise an input for an angular position of part of the mechanism, typically a steering column. This may allow a bias to be generated by means of which the steering column may be returned to a straight-ahead position in use.

Any or all of the signal processing unit, first and second calculating units, the differentiator and the filter may form part of at least one microprocessor.

The torque demand signal may include a gain factor dependent upon the column torque, or perhaps more specifically the magnitude of the column torque. This can be achieved by multiplying the torque demand signal by a column torque dependent gain factor before it is passed to the motor drive stage.

The gain factor may be higher at low column torques than it is at high column torques. This ensures that the amount of damping when the steering is close to the straight ahead position (at low torques) is high to effectively damp on-centre artefacts like shimmy yet without adversely effecting stability off centre.

The gain may be derived by obtaining a gain factor from a look up table which comprises gain factors referenced by column torque.

Other advantages of this invention will become apparent to those skilled in the art from the following detailed description of the preferred embodiments, when read in light of the accompanying drawings.

DETAILED DESCRIPTION OF THE INVENTION

Figure 1:
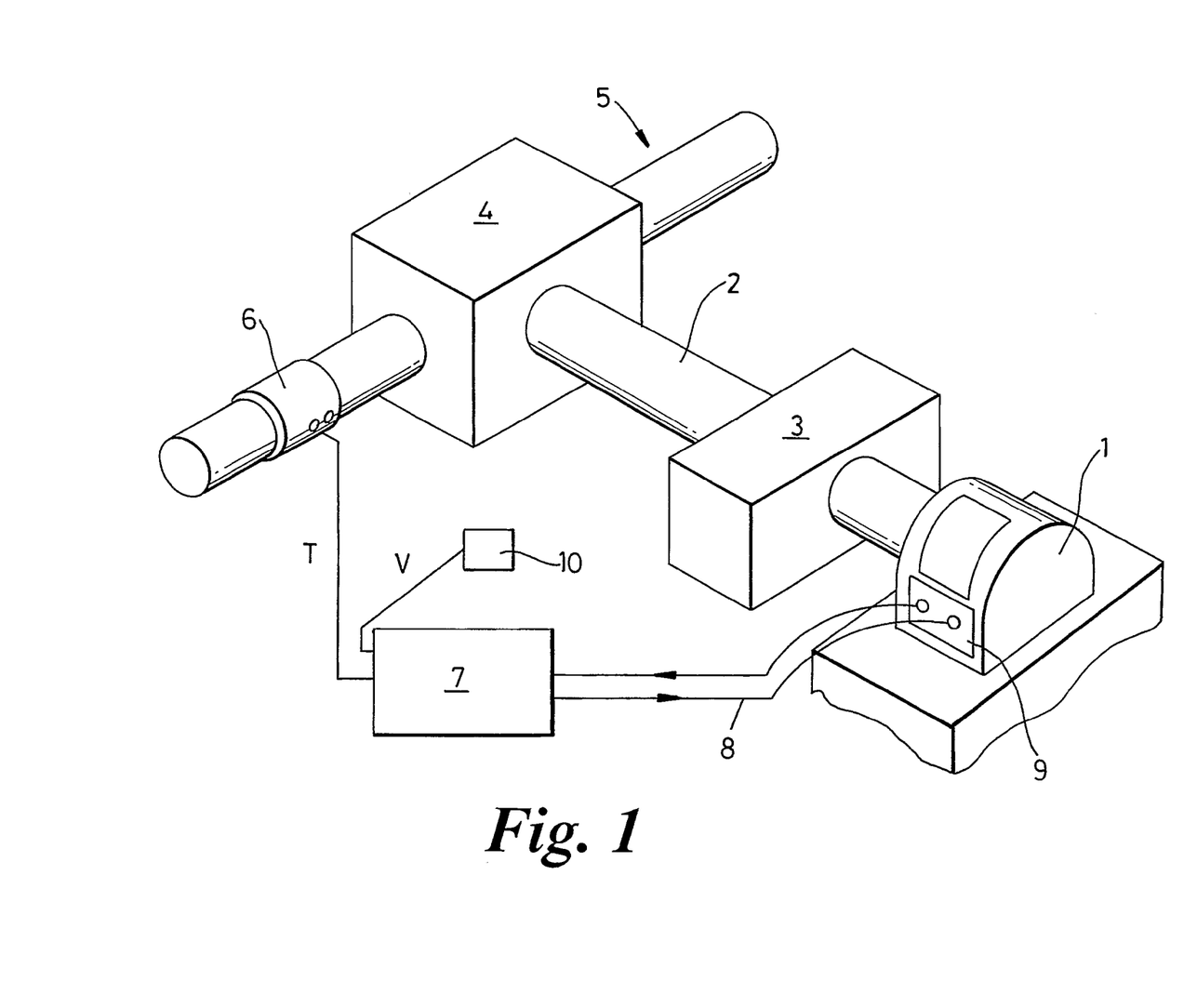
FIG. 1 shows an electronic power assisted steering (EPAS) system according to an embodiment of the present invention.

An electric power assisted steering system is illustrated in FIG. 1 of the accompanying drawings. The system comprises an electric motor 1 which acts upon a drive shaft 2 through a gearbox 3. The drive shaft 2 terminates with a worm gear 4 that co-operates with a wheel provided on a portion of a steering column 5 or a shaft operatively connected to the steering column.

The steering column 5 carries a torque sensor 6 that is adapted to measure the torque carried by the steering column that is produced by the driver of the vehicle as the steering wheel (not shown) and hence steering column is turned against the resisting force provided by the vehicles road wheels (also not shown). The output signal—referred to herein as the torque signal T—from the torque sensor 6 is fed to a first input of an electric circuit which includes a signal processing unit 7. This is typically an ASIC dedicated integrated circuit.

An angular velocity sensor is also provided on the steering column shaft. As shown in FIG. 1 this is an integral part of the torque sensor 6. This produces an output signal indicative of the angular velocity co of the shaft. The output from the velocity sensor is fed to a second input of the signal processing unit 7.

Furthermore a column position sensor is provided which produces an output signal $N_{col}$ indicative of the angular position of the steering column.

Three input values are passed to the signal processor: column velocity ω, column angular position $N_{col}$ and column torque T.

The signal processing unit 7 acts upon the three input signals to produce, as its output, a torque demand signal 8 that is passed to a motor controller 9. The motor controller 9 converts the torque demand signal 8 into drive currents for the electric motor 1.

The value of the torque demand signal 8 corresponds to the amount of assistance torque to be applied to the steering column by the electric motor 1. The value will vary from a minimum value corresponding to maximum output torque for the motor in one sense, through zero torque when the demand signal is zero, to a maximum motor torque of the opposite sense.

The motor controller 9 receives as its input the torque demand signal and produces currents that are fed to the motor to reproduce the desired torque at the motor drive shaft 2. It is this assistance torque applied to the steering column shaft 5 that reduces the effort needed by the driver to turn the wheel.

Figure 2:
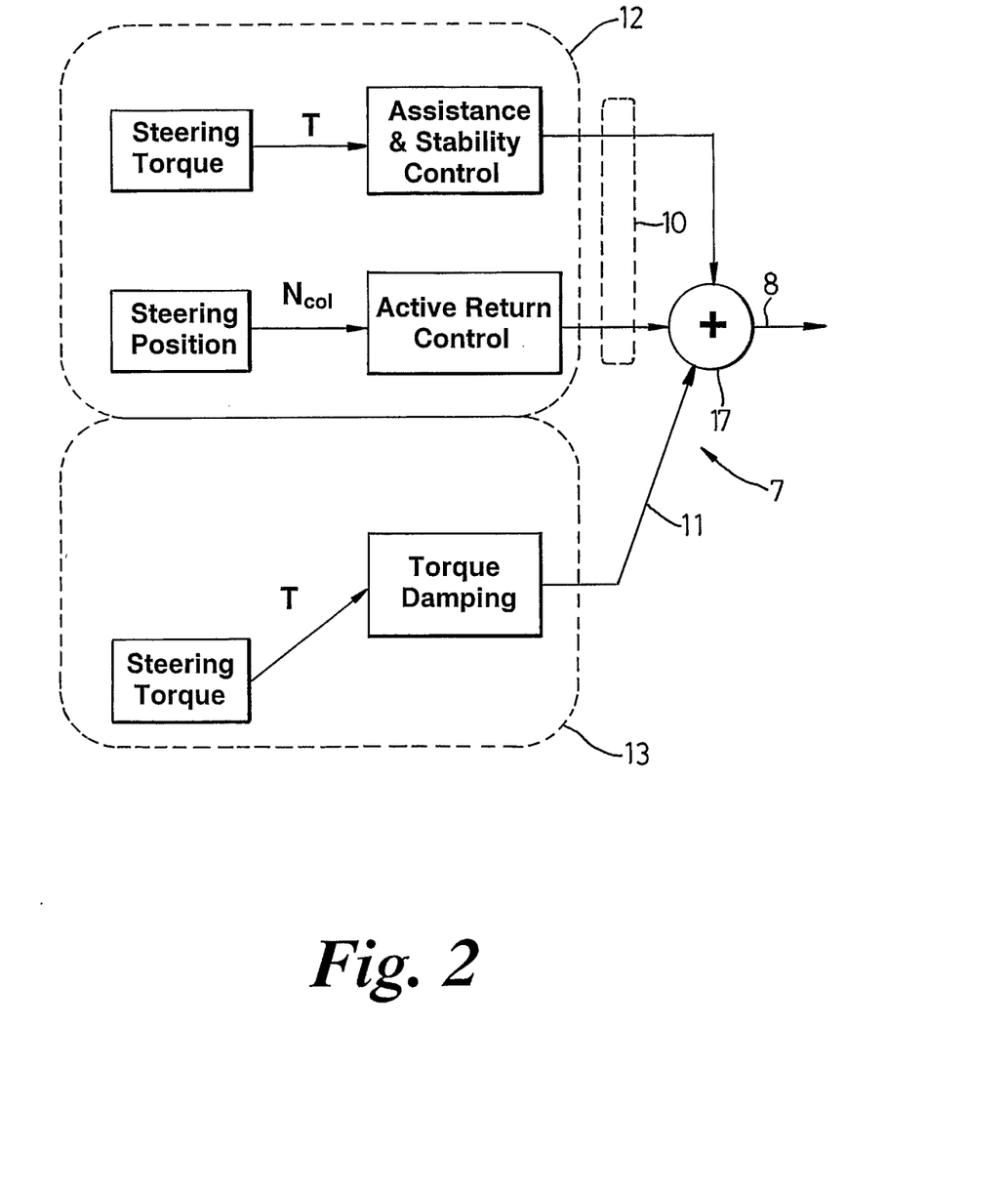
FIG. 2 shows the functions carried out by the signal processing unit of the EPAS system of FIG. 1.

FIG. 2 illustrates the functional steps undertaken by the signal processing unit 7 in producing the torque demand signal 8. It can be seen that the torque demand signal 8 is produced as two components: an assistance or initial torque demand signal 10 and a torque damping signal 11. These two components 10, 11 are additively combined within the circuit to form the torque demand signal 8.

The signal processing unit 7 is accordingly split into two calculating units: first calculating unit 12 and second calculating unit 13. The first calculating unit 12 calculates the initial torque component 10 and the second calculating unit 12 calculates the torque damping signal 11.

The first calculating unit 10 takes as inputs the torque signal T and the steering column position $N_{col}$. The torque signal. T is used to calculate the basis for the demanded torque using typically a linear mapping, although other mappings are possible. This value is corrected by a bias based on $N_{col}$ to ensure that the steering column returns to the straight-ahead position (as most drivers have become accustomed to this). Combined together, these values form the initial torque demand signal 10.

Figure 5:
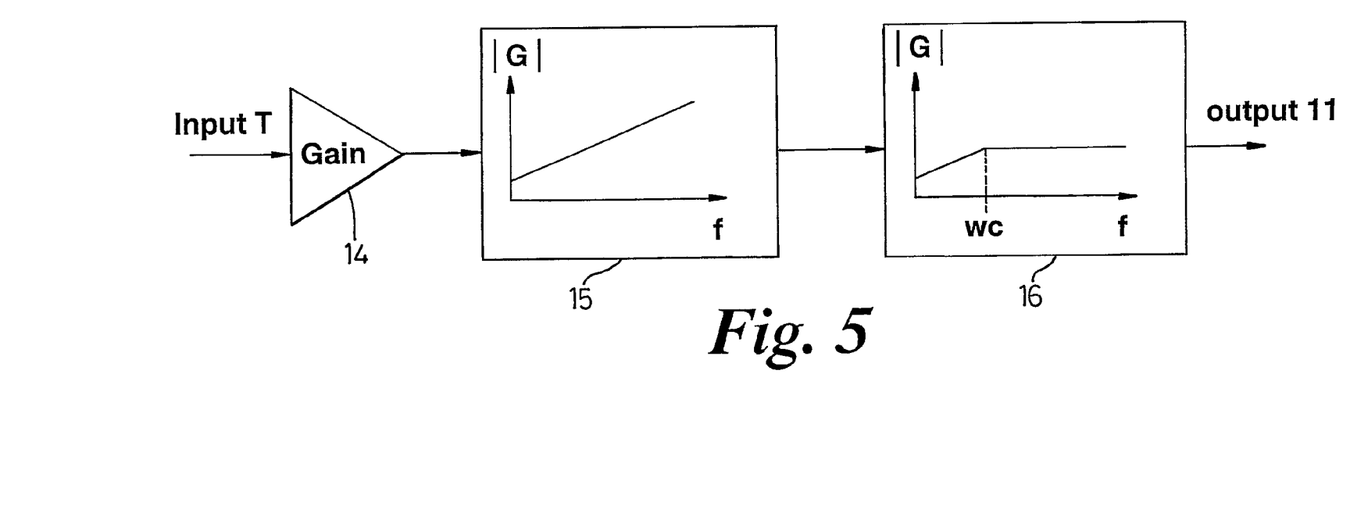
FIG. 5 is a flow chart showing how the damping signal of the EPAS system of FIG. 1 is calculated.

The functioning of the second calculating unit 13 can be seen in more detail in FIG. 5 of the accompanying drawings. The second calculating unit 13 takes as an input the torque signal T. Firstly, the unit transforms the input torque signal from the time domain into the frequency domain. A suitable transform would be the Lorenz transform, although other transforms such as the Fourier transform would be acceptable.

The transformed signal is then multiplied by a signal amplifier 14, to introduce an amount of gain. This may depend on the vehicle speed, but otherwise may be considered to be a constant factor $K_a$.

The amplified signal then passes to differentiator 15. As this is carried out in the frequency domain, this involves multiplication of the frequency domain signal by the angular frequency s. This is depicted in the Bode (logarithm of gain against logarithm of frequency) plot shown at 15 in FIG. 5.

Once differentiated, the signal then passes to a high pass filter 16. As this is carried out in the frequency domain, it can be represented by multiplication by $$\frac{s}{s+wc},$$

where we is the cutoff frequency. This is schematically depicted in the Bode plot at 16 in FIG. 5. The output of this filter is therefore the torque damping signal 11.

Figure 4:
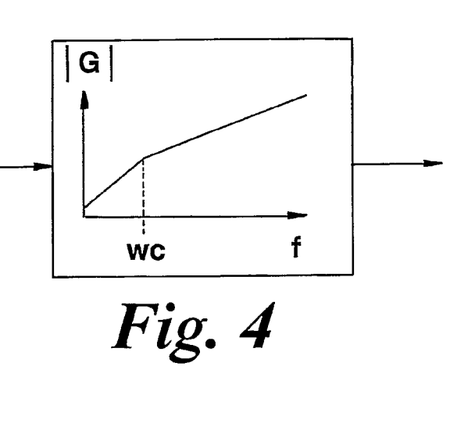
FIG. 4 shows a bode plot combining differentiation with a high pass filter, in line with the embodiment of FIG. 1.

The resultant transform, in the frequency domain, can be seen in FIG. 4 of the accompanying drawings. This shows a Bode plot of the overall response. The transfer function of the transformation from time domain torque signal T to the torque damping signal can be represented as:

$$G(s) = K_a s \frac{s}{s+wc}.$$

Figure 3:
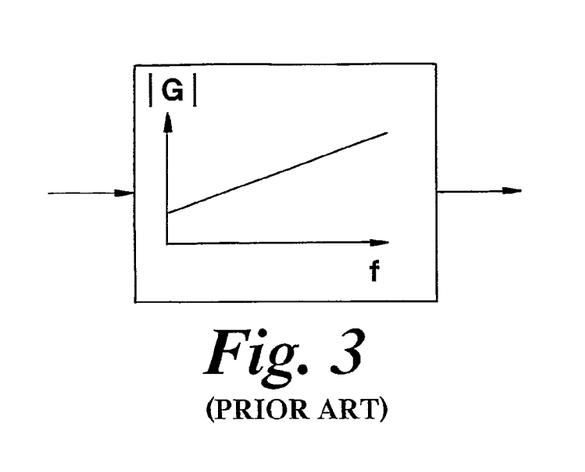
FIG. 3 shows a bode plot of the frequency response of an EPAS system where the torque signal is merely differentiated.

This can be contrasted to that of damping component of the prior art (differentiation only) system shown in FIG. 3 of the accompanying drawings; at low frequencies the transfer function (and hence the response of the torque damping signal) can be seen to be lower in the present embodiment than in the prior art. Accordingly, the reduced gain at low frequencies of the embodiment described herein reduces the "first mode" of oscillation described above by reducing the peak 22 shown in FIG. 6.

Once the torque damping signal 11 has been generated by the second calculating unit 13, the signal processing unit 7 then adds using adding function 17 the torque represented by the torque damping signal to the initial torque demand signal 10 to provide torque demand signal 8. This addition, rather than subtraction, adds extra assistance to the driver at the points on the frequency scale where they are most needed to overcome the undesirable oscillations in the EPAS system.

Figure 7:
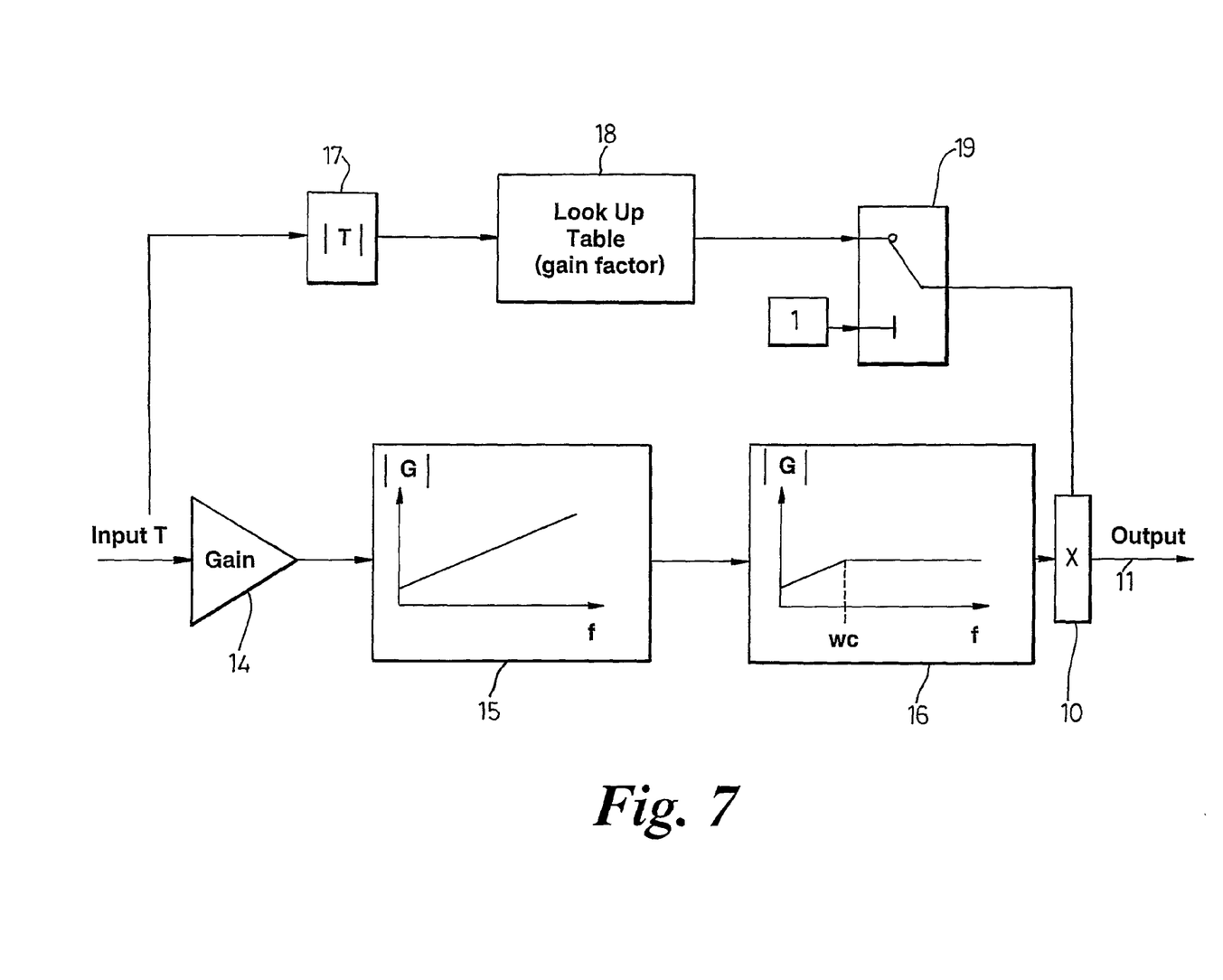
FIG. 7 is a flow chart of an alternative way of calculating the damping signal of an EPAS system of FIG. 1.

In a further refinement shown in FIG. 7 of the accompanying drawings the output is also made dependent on the column torque by incorporating a gain factor. This gain factor is obtained by determining the magnitude 17 of the column torque, using this to access an associated gain factor stored in a look up table 18, and multiplying 20 the output of the block 16 by this gain factor to obtain the output 11.

The values stored in the look-up table 18 are such that a higher gain factor is applied at low column torques than is applied at high column torques. This ensures relatively high damping when the steering is On-centre to counter shimmy of the steering, yet is relatively low off centre to avoid destabilising the system.

A switch 19 may also be provided for switching the gain in or out. When switched out a unity gain is applied.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An electric power assisted steering system for a vehicle, comprising:
    a steering mechanism which operatively connects a steering wheel to road wheels of the vehicle;
    a torque sensor arranged to, in use, produce a torque signal indicative of the torque carried by a portion of the steering mechanism;
    an electric motor operatively connected to the steering mechanism;
    a signal processing unit arranged to, in use, produce from the torque signal a torque demand signal representative of a torque to be applied to the steering mechanism by the motor, the signal processing unit comprising a first calculating unit arranged to calculate an initial torque demand signal dependent on the torque signal, and a second calculating unit arranged to, in use, calculate a torque damping signal indicative of an amount the initial torque signal is to be damped in order to generate the torque demand signal;
    a motor drive stage arranged to provide, in use, a drive current to the motor responsive to the torque demand signal;
    wherein the second calculating unit comprises an input for a signal dependent upon the torque demand signal, a differentiator, arranged to, in use, differentiate the input signal dependent upon the torque signal and a high pass filter arranged to filter the input signal to reduce low frequency components thereof;
    wherein the signal processing unit is arranged to, in use, combine the amount of torque indicated by the torque damping signal with the amount of torque indicated by the initial torque demand signal in order to generate the torque demand signal; and
    wherein the amounts axe combined in an additive manner so as to add, the amount of torque indicated by the torque damping signal to the amount of torque indicated by the initial torque demand signal.

2. The electric power assisted steering system of claim 1 wherein the high pass filter is, in use, applied to the output of the differentiator.

3. The electric power assisted steering system of claim 1 wherein, in use, the input signal is applied to the filter before being passed to the differentiator.

4. The electric power assisted steering system of claim 1 wherein the second calculating unit is arranged to work on the input signal in the frequency domain.

5. The electric power assisted steering system of claim 4 wherein the second calculating unit is arranged to, in use, carry out a transform on the input signal.

6. The electric power assisted steering system of claim 5 wherein the transform is the Lorenz transform.

7. The electric power assisted steering system of claim 4 wherein the application of the filter and the differentiator to the input signal can be represented by the application of a transfer function to the input signal of the form G(s) where s is the angular frequency:

$$G(s) = K_a s \frac{s}{s + wc}$$

where $K_a$ is a constant and we is a cut-off frequency.

8. The electric power assisted steering system of claim 1 wherein the second calculating unit is provided with an input for the vehicle speed and which is arranged, in use, to reduce the amount of damping at low speed.

9. The electric power assisted steering system of claim 1 wherein at least one of the signal processing unit, first and second calculating units, the differentiator and the filter form part of at least one microprocessor.

10. The electric power assisted steering system of claim 1 wherein the torque demand signal includes a gain factor is dependent upon the column torque.

* * * * *

UNITED STATES PATENT AND TRADEMARK OFFICE
CERTIFICATE OF CORRECTION

| | |
|---|---|
| PATENT NO. | : 8,666,597 B2 |
| APPLICATION NO. | : 12/085512 |
| DATED | : March 4, 2014 |
| INVENTOR(S) | : Angel Luis Andres Fernandez et al. |

It is certified that error appears in the above-identified patent and that said Letters Patent is hereby corrected as shown below:

In the Claims:

Column 6, Claim 1, Line 64, delete "axe" and insert --are--;

Column 8, Claim 7, Line 6, delete "we" and insert --wc--.

Signed and Sealed this
Thirteenth Day of May, 2014

Michelle K. Lee
*Deputy Director of the United States Patent and Trademark Office*